Dec. 13, 1949    G. I. CHINN    2,491,251
TORSION DYNAMOMETER
Filed July 3, 1947
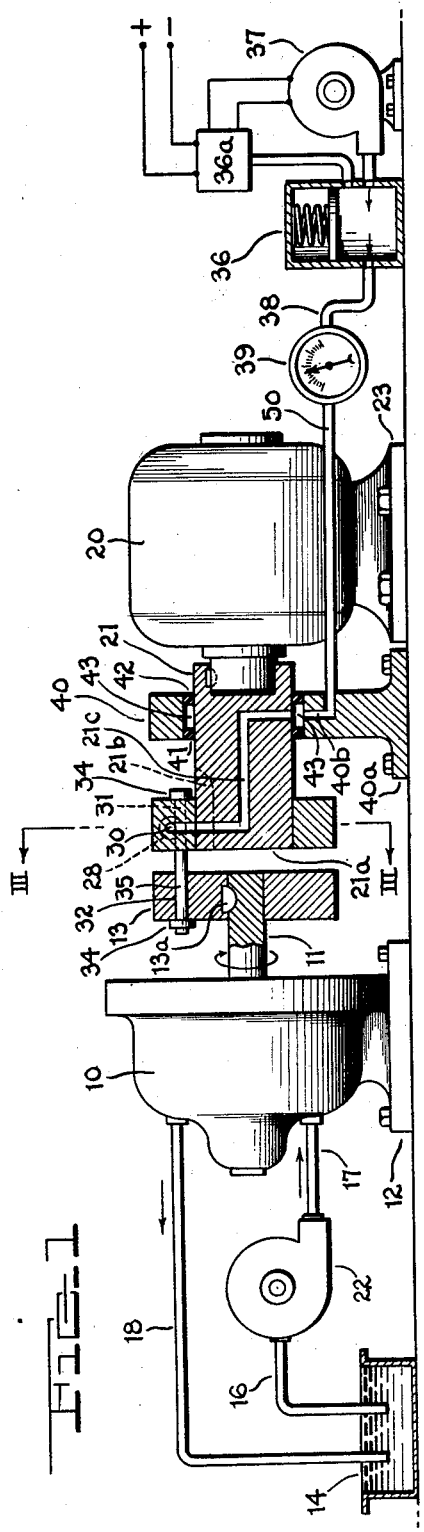
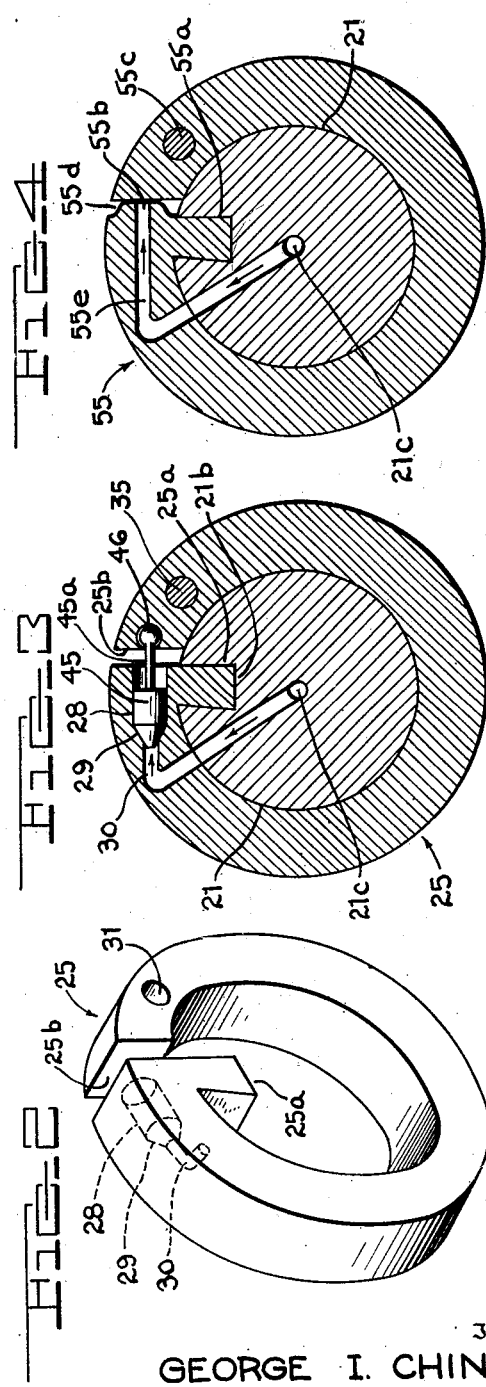
Inventor
GEORGE I. CHINN,
By John Howard Joynt
HIS Attorney Patented Dec. 13, 1949

2,491,251

UNITED STATES PATENT OFFICE 2,491,251

TORSION DYNAMOMETER

George I. Chinn, Baltimore, Md.

Application July 3, 1947, Serial No. 758,917

7 Claims. (Cl. 73—136)

My invention relates to torque measuring apparatus, and more especially to dynamometers and a method for measuring force exerted and power expended.

An object of my invention is the provision of a single, sturdy and reliable dynamometer which is easy to operate and maintain, and which is highly satisfactory for use under any of a variety of specific conditions calling for the measurement of torque.

A further object of my invention is the provision of a simple, direct and highly practical method for measuring torque, as for example the forces of rotation developed in starting and operating a rotary hydraulic motor under load.

Other objects of my invention in part will be obvious and in part pointed out hereinafter.

The invention accordingly consists in the several elements, combination of parts, and features of construction, and in the several steps and the relation of each of the same to one or more of the others, as described herein, the scope of the application of which is indicated in the following claims.

In the accompanying drawing representing embodiments of my torque measuring apparatus:

Figure 1 represents a torque measuring system employing a measuring device more fully illustrated in Figures 2 and 3;

Figure 2 shows in three dimensional view a torque measuring ring;

Figure 3 is a sectional view along the line III—III in Figure 1;

Figure 4 is a sectional view of a modified torque measuring ring.

Like reference characters denote like parts throughout the several views.

As conducive to a clearer understanding of certain features of my invention, it may be noted at this point that throughout a wide range of industrial arts and sciences, wherein varied activities are carried on, motors or engines having a proper rating are in considerable demand. In this connection it of course is important that the power units used have a sufficiently large capacity to avoid overloading, inefficiencies and failure in operation. Although a sufficiently large rating is important to avoid the various difficulties just noted, a power unit having a capacity far beyond expected peak load represents an unnecessary outlay and wasteful operation in view of the actual load encountered. Thus some accurate means for determining the capacity of a motor as applied to a given function, or with consideration to varying load conditions, is important in the achievement of economical and efficient installation and operation.

A variety of dynamometers in the prior art have heretofore been employed for such purposes as arriving at power ratings for motors and indicating the best units for meeting particular power demands. A number of these dynamometers depend upon mechanical friction between a mechanical brake and the shaft of an engine under test, and measure torque by means of a definite lever arm. Among the better known dynamometers of this class is the Prony brake which absorbs substantially all of the energy developed by an engine and transmits the resulting force to a measuring scale or balance. Another dynamometer, also falling in this same general class, is the water brake which utilizes viscosity or fluid friction, instead of mechanical friction between sliding surfaces. In the latter apparatus, an impeller, driven by the engine under test, rotates in a casing, the latter being mounted in trunnion bearings and restrained from turning only by an arm attached to the casing and to a scale beam. As the impeller rotates, moving water with it, a resistance to flow of water reacts on the dynamometer casing and is registered on the scales.

Either the Prony brake, the water brake, or some other suitable loading device can absorb the output power of the engine under test, but the use of scales or balances for measuring the torque developed often is not entirely satisfactory where it is necessary to balance the scales by hand or where varying torques are encountered during a given test. The same comments apply to electric loading or braking devices, such as an electric generator, which heretofore have been employed for absorbing the power of an engine and transmitting this power to a scale or balance. The mechanism of the scale or balance, and the mechanical connection with the brake for providing a definite lever arm, sometimes introduce certain difficulties in installation and operation which render their use undesirable.

An outstanding object of my invention accordingly is the provision of a simple, compact and reliable torque measuring device which is well suited for determining the power rating or torque properties of a rotary machine, and which readily responds to torque variations brought to bear on or by the rotary machine while the latter is in operation.

Referring now more particularly to the practice of my invention, I find that a reliable measurement of the torque developed by a rotary machine or like apparatus is had by measuring the quantity of fluid discharged from a variable orifice valve where the flow varies in accordance with the torque. This method conveniently is effected through the use of a steel spring or like means which is deflected by an amount depending upon the magnitude of the torque developed by the machine under test. The variable deflection of this spring serves to open and close the variable orifice valve, for discharging fluid, as for example air, from a source subjected to constant pressure. The amount of fluid discharged is conveniently measured by means of a flow meter such as one subjected to the constant fluid pressure at the intake under flow as permitted in the variable orifice valve.

As illustrative of the practice of my invention, I provide a motor 10 (see Figure 1), as for example of the rotary hydraulic type, which is to be subjected to test for evaluating the torque developed by the same under load. The motor is mounted on a suitable base 12 or otherwise is anchored in such manner as to resist displacement from the position desired for testing and to absorb any reaction of output shaft 11 of the motor which might tend to effect this displacement. On the motor shaft there is a collar 13 keyed at 13a for transmitting the output power in a manner hereinafter to be more fully described.

I find it convenient to employ a rotary hydraulic pump 22 for driving the hydraulic motor. The pump is connected in intermediate hydraulic series position with relation to the motor and a fluid supply reservoir 14 by a feed line 16, leading from the reservoir to the pump inlet, and by a conduit 17 interconnecting the pump outlet and the motor inlet. A return line 18 extends from the motor outlet to the reservoir, for returning expended fluid.

For loading the hydraulic motor I employ a suitable loading unit 20, the latter preferably being an electric generator having a variable resistance in the field circuit for thus imposing a variable magnetic load on the generator armature, and armature shaft 21. With this arrangement the load or drag on the armature shaft is constant for any given setting of the variable resistance. The armature shaft preferably is in axial alignment with the shaft 11 of the hydraulic motor, the alignment being maintained during generator operation by a suitable mounting 23 for the generator. When desired some other loading unit of course may be employed instead of the generator.

On the end 21a of the generator armature shaft there is a split annular flat spring 25 illustratively having a rectangular cross-section such as represented in Figure 2 of the accompanying drawing. One end of the spring terminates in a lug 25a which fits into a corresponding groove 21b in the generator armature shaft for transmitting driving power of the hydraulic motor 10 to that shaft. Above the lug, but beginning at that same end of the spring, is a bore 28 extending to a tapered seat area 29 and finally connecting with a reduced bore 30 which reaches to the inside surface of the spring adjoining the armature shaft. The end 25b of the spring is a floating end, this having a lateral bore 31. A corresponding bore 32 is in the motor shaft collar 13. These two bores receive a link pin 35 which interconnects the collar and the floating end of the spring and accordingly affords a driving connection between the motor shaft 11 and generator armature shaft 21. The link pin is retained in the position of interconnection by suitable collars 34.

To supply air under conditions for measuring effective torque applied to the ring 25, I employ a suitable source of air supply such as an accumulator 36 in which air is maintained at a substantially constant pressure by a compressor 37 or the like. The accumulator conveniently includes a pressure responsive relay 36a for switching on and off the compressor motor and thus ensuring the constant air pressure. An air flow meter 39 is connected to an air outlet line 38 from the accumulator and thus is suited for operation at a constant fluid pressure at the intake. The output side of the flow meter 39 supplies air to one end of the annular flat spring 25, through the bores 28 and 30. The supply connection for this purpose, illustratively includes a fixed collar 40 which receives the generator armature shaft 21 and supports the rotary seals 41 and 42. These rotary seals define an air tight compartment 43 between the collar and shaft. The collar has a suitable base or fixed mounting 40a. A bore 40b in the collar is connected with the output side of the flow meter 39 by line 50 and empties into the air compartment 43 of the rotary seal. The generator armature shaft has an air passage bore 21c therein which affords an air outlet from the compartment 43 and connects with the bore 30 in the annular flat spring as by matched pressed fit of the spring on the shaft 21. Any suitable substitute connection of course may be provided between the air supply and the annular spring, the arrangement just described being preferred for such reasons as compactness.

The bore 28 in the lug end of the annular flat spring is fitted with a poppet valve 45 which, when the rotary hydraulic motor 10 is at rest, seats against the surface 29 and seals the reduced bore 30, thus preventing the flow of air. The stem 45a of this poppet valve is fitted to the floating end of the spring by a ball joint 46, by means of which any deflection of the spring will open or close the valve as the case may be, thereby controlling the escape of air.

Assuming that the hydraulic pump 22 is in operation, fluid courses from the reservoir 14 through feed line 16 to the pump and thence is supplied under pressure through conduit 17, thus energizing the hydraulic motor 10 and returning to the reservoir through line 18. On the further assumption that shaft 11 of the hydraulic motor is rotating in the direction of the arrow in Figure 1 and that armature shaft 21 is subjected to the magnetic braking action of the generator field windings, as determined by a specific resistance setting of the field circuit, the poppet valve 45 opens. This opening is effected to the extent of the torque developed by the hydraulic motor under the conditions of operation or test and by the tendency of the floating end of the annular flat spring 25 to separate from its fixed end. This separation of the square end of the spring has a direct influence upon the extent to which the poppet valve 45 opens.

The unseating of the valve allows air to escape from the accumulator 36 through outlet line 38 and flow meter 39, through line 50, bore 40b of the collar 40 and into air compartment 43 of the rotary seal, through the compartment outlet passage 21c and thence into bore 30, and past the valve into bore 28 and to the atmosphere. This flow is indicated by the flow meter in the air escape system. Any substantial drop in pressure from the constant value in the accumulator is compensated for by pressure responsive relay 36a which switches on the motor of the compressor 37 and shuts off the same when conditions in the accumulator so permit.

Should the torque load of the motor increase, as on the occasion of a high resistance setting of the generator field and consequent increased magnetic drag on the armature shaft 21, the ends of spring 25 effect a further separation under the increased load, thus increasing the poppet valve orifice and the quantity of escaping air. The quantity of air which escapes past the flow meter and poppet valve, once the dynamometer system has been calibrated, corresponds directly to the torque on the motor under test and affords a basis for determining such properties as brake horsepower. Where desired the loading unit 20 is set to a point of loading which substantially stalls the motor 10 under test. A tachometer or the like (not shown) is conveniently employed on the shaft 11 of the motor for determining the operating speed for purposes well known in the art.

A somewhat modified spring arrangement which at times I employ for controlling the escape of air in accordance with developed torque to which the spring is subjected, is disclosed in Figure 4. This spring, indicated in general by the reference numeral 55, is of an annular strap configuration much like the spring 25 hereinbefore described. A lug 55a at one end of the spring is suited for taking a pressed fit fixed position on the shaft of the loading unit such as in the groove 21b of the generator armature shaft. The other end of the spring is a free or floating end which serves to mask an orifice 55b by an amount varying with the torque load transmitted by means of a suitable pin in bore 55c, as for example a pin serving the same general function as link pin 35 in Figure 1. An annular protruding lip 55d on the lug end of the spring extends to abutment with an adjoining surface of the floating end. An air passage 55e passes from the inside surface of the spring and opens within the perimeter of the protruding lip so as to offer an escape for air. The passage conveniently matches with the outlet of passage 21c (see Figure 1) as by press fit of the spring 55 on shaft 21. Where a discharge of air, corresponding to variations in torque which deflect the spring 55 is effected, the actual rate of air flow depends upon the extent of separation of the spring ends and the effective orifice defined between the protruding lip 55d and the floating spring end surface adjoining bore 55c.

Thus it will be seen that in this invention there are provided a method and apparatus for measuring the torque of a rotary power unit, in which the various objects hereinbefore set forth together with many thoroughly practical advantages are successfully achieved. It will be seen that the method is simple, direct and reliable for such purposes as arriving at power ratings for rotary equipment, and that the apparatus itself is simple and easy to handle. It will also be noted that a variety of the mechanical elements employed, such as the torque receiving spring, are inexpensive, self-contained, readily accessible for repairs, adjustments and replacements, and have a minimum of moving parts subject to wear.

While several arrangements have been described herein for controlling the flow of air in accordance with the developed torque, it will be appreciated that various other and different arrangements fall within the scope of the present invention. The torque spring control over air discharge, for example, is at all times effected by resorting to a poppet valve unit attached to the outside surfaces of the spring ends, and it will also be appreciated that external connections for supplying air or other fluid to the valve may be made where practicable regardless of whether the valve is built into the spring or attached outside the same.

It will also be understood that sometimes I connect the split annular spring between the motor and armature shafts by affixing the lug end of the spring to the motor shaft and the floating end and corresponding collar to the armature shaft, the motor shaft illustratively being hollow for supplying air to the poppet valve.

As many possible embodiments may be made of my invention and as many changes may be made in the embodiments hereinbefore set forth, it is to be understood that all matter described herein is to be interpreted as illustrative and not as a limitation.

I claim:

1. A torque measuring device, comprising, a split annular spring for receiving torque, means for applying torque to said spring to effect a deflection of the adjacent ends thereof relative to each other depending in extent upon the imposed torque load, and valve means controlled by the deflection of the split annular spring for varying the flow of a fluid according to the relative deflection of said spring ends.

2. A torque measuring device, comprising, a split annular spring for receiving torque, means for applying torque to said spring to effect a deflection of the adjacent ends thereof relative to each other depending in extent upon the imposed torque load, and a fluid valve portion at one end of said spring and controlled in effective outlet opening by relative deflection of means including said adjacent spring end.

3. A torque measuring device, comprising, a split annular spring for receiving torque, means for applying torque to said spring to effect a deflection of the adjacent ends thereof relative to each other depending in extent upon the imposed torque load, and valve means having components individually connected with the respective spring ends for varying the flow of a fluid according to said relative deflection.

4. A torque measuring device, comprising, a split annular spring for receiving torque, means for applying torque to said spring to effect a deflection of the adjacent ends thereof relative to each other depending in extent upon the imposed torque load, and a fluid passage emptying at one end of said spring and controlled in effective outlet opening by the masking effect and relative deflection of said adjacent spring end.

5. A torque measuring device, comprising, a split annular spring having a lateral bore at one end for receiving a torque transmitting connection, and having an inturned substantially radial lug at the opposite end serving as a shaft key, said spring end with the lug having a fluid supply bore leading through the body thereof to an outlet controlled in effective opening by means including said adjacent spring end.

6. A torque measuring system, comprising, a split annular spring for receiving torque, means for applying torque to said spring to effect a deflection of the adjacent ends thereof relative to each other depending in extent upon the imposed torque load, a meter for measuring the flow of fluid, a source of substantially constant pressure fluid supply connected with the inlet of said flow meter, and fluid valve portion at one end of said spring connected with the outlet of said flow meter and controlled in effective opening by the relative deflection of means including said adjacent end of the spring.

7. Apparatus for measuring the torque of a rotary motor, which includes a split annular spring susceptible to deflection by an amount depending upon the specific motor torque applied thereto, means supplying fluid at constant pressure to a flow meter, valve means included in said spring and varying the outlet flow of fluid from said flow meter as a function of deflection of said spring, and means measuring the quantity of fluid passing through said flow meter thus obtaining a representative measure of the motor torque.

GEORGE I. CHINN.

REFERENCES CITED

The following references are of record in the file of this patent:

UNITED STATES PATENTS

| Number | Name | Date |
| --- | --- | --- |
| 195,837 | Nagle | Oct. 2, 1877 |
| 1,982,528 | Mennesson | Nov. 27, 1934 |
| 2,089,604 | Hagy | Aug. 10, 1937 |
| 2,172,095 | White | Sept. 5, 1939 |
| 2,289,285 | Chilton | July 7, 1942 |
| 2,314,178 | Tate | Mar. 16, 1943 |